(12) United States Patent
Cohen (10) Patent No.: US 12,142,998 B2
(45) Date of Patent: Nov. 12, 2024

(54) SYSTEM AND METHOD FOR ESTIMATING A CURRENT IN AN INDUCTOR OF A POWER CONVERTER

(71) Applicant: TEXAS INSTRUMENTS INCORPORATED, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 267 days.

(21) Appl. No.: 17/829,090

(22) Filed: May 31, 2022

(65) Prior Publication Data
US 2023/0387777 A1    Nov. 30, 2023

(51) Int. Cl.
| | |
|---|---|
| H02M 3/158 | (2006.01) |
| H02M 1/00 | (2006.01) |
| H02M 1/32 | (2007.01) |
| H02M 1/42 | (2007.01) |
| H02M 7/217 | (2006.01) |

(52) U.S. Cl.
CPC ............ *H02M 1/0009* (2021.05); *H02M 1/32* (2013.01); *H02M 1/4225* (2013.01); *H02M 3/158* (2013.01); *H02M 7/2176* (2013.01)

(58) Field of Classification Search
CPC ........ H02M 1/0009; H02M 1/32; H02M 1/42; H02M 1/4225; H02M 3/156; H02M 3/158; H02M 7/2176
See application file for complete search history.

(56) References Cited

U.S. PATENT DOCUMENTS

| | | | | |
|---|---|---|---|---|
| 5,986,902 A | * | 11/1999 | Brkovic | H02H 7/1213 323/276 |
| 6,879,136 B1 | * | 4/2005 | Erisman | H02M 3/156 323/224 |
| 2022/0209646 A1 | * | 6/2022 | Sun | H02M 1/0009 |

* cited by examiner

*Primary Examiner* — Gary L Laxton
(74) *Attorney, Agent, or Firm* — Charles F. Koch; Frank D. Cimino (57) ABSTRACT

In an example, a current estimating circuit includes a current estimating resistor coupled in series with a current estimating capacitor. The current estimating resistor and the current estimating capacitor are configured to provide a voltage across the current estimating capacitor during a first portion of a switching cycle, in which the voltage across the current estimating capacitor is proportional to an inductor current that flows through an inductor. The current estimating circuit includes a sense resistor configured to provide a sensed voltage across the sense resistor during a second portion of the switching cycle. The current estimating circuit includes a switch configured to apply the sensed voltage to the current estimating capacitor to provide the voltage across the current estimating capacitor during the second portion of the switching cycle.

18 Claims, 4 Drawing Sheets

SYSTEM AND METHOD FOR ESTIMATING A CURRENT IN AN INDUCTOR OF A POWER CONVERTER

TECHNICAL FIELD

This description relates generally to power electronics, and more particularly to a system and method for estimating a current in an inductor of a power converter.

BACKGROUND

An alternating current (AC)-to-direct current (DC) power converter converts an AC voltage such as a building's AC mains to a DC voltage usable to power electronics. An AC-to-DC power converter may include a bridge rectifier to rectify an AC input voltage to the power converter. Bridge rectifiers may draw current from the AC mains in short, high-magnitude pulses. In an ideal system, the power drawn from the AC mains is utilized to do useful work. This is only possible when the AC current is in phase with the AC voltage. When the phase between current and voltage varies (as would occur with the use of a baseline bridge rectifier), some of the current from the AC mains does not perform useful work. Accordingly, an AC-to-DC power converter may include a power factor correction (PFC) circuit. The PFC circuit functions to ensure that the AC input current to the power converter is closer to sinusoidal in shape and in-phase with the AC voltage. The PFC circuit shapes the input current to augment the real power drawn from the AC mains (as opposed to the reactive power).

An AC-to-DC power converter may include the PFC circuit with the bridge rectifier and a boost topology on a front-end to produce an internal DC bus voltage, such as for powering a 300 or 400 volt (V) DC bus. The power converter is designed to draw a synthesized input current that is proportional to the instantaneous value of an input line voltage. In this way, high power factor can be achieved for the power converter, such as a power factor that approaches 100%. However, such design arrangements employ an input capacitor and other circuit components in the input circuit architecture that generally add cost for the design thereof. The circuit architecture may necessitate current sensing circuitry that is formed without a conductive path between an input and output side of the current-sensing circuitry, which adds complication and efficiency challenges for the current-sensing circuitry.

In a bridgeless AC-to-DC power converter, sensing an inductor current presents a design challenge. Sensing the inductor current is generally not referenced to local circuit ground, which indicates that a simple shunt common-sense device generally cannot be used. The input current direction in the power converter reverses with the AC input line voltage polarity. High-frequency current sensing transformers are expensive and difficult to use. Current sensing might be done with a Hall-effect sensor, but this too introduces a considerable cost burden. A Hall-effect sensor also is not generally fast enough for cycle-by-cycle current limit sensing. As a result, existing bridgeless AC-to-DC power converter solutions present a difficult choice for low-power applications, e.g., for power converters that provide about 75-250 watts (W), particularly in h igh-volume personal electronics applications.

Accordingly, the problem of sensing inductor current, particularly for a bridgeless AC-to-DC power converter, is an inherent problem in a power converter design that achieves a high power factor.

SUMMARY

In an example, a power converter includes a first power switch and a second power switch coupled to a power terminal. The first power switch is configured to conduct during a first portion of a switching cycle of the power converter, and the second power switch is configured to conduct during a second portion of the switching cycle of the power converter. The power converter also includes an inductor coupled to the first power switch and the second power switch. The power converter also includes a current estimating circuit including a current estimating resistor coupled in series with a current estimating capacitor and coupled to the power terminal. The current estimating resistor and the current estimating capacitor are configured to provide a voltage across the current estimating capacitor during the first portion of the switching cycle, in which the voltage across the current estimating capacitor is proportional to an inductor current that flows through the inductor. The current estimating circuit includes a sense resistor, coupled in parallel to the current estimating capacitor, configured to provide a sensed voltage across the sense resistor during the second portion of the switching cycle. The current estimating circuit includes a switch configured to apply the sensed voltage to the current estimating capacitor to provide the voltage across the current estimating capacitor during the second portion of the switching cycle.

DETAILED DESCRIPTION

Corresponding numerals and symbols in the drawings generally refer to corresponding parts unless otherwise indicated. The drawings are not necessarily drawn to scale. In this description, some acts or events may occur in different orders than illustrated and/or concurrently with other acts or events, and some illustrated acts or events are optional.

This description includes examples of a current-sensing circuit arrangement and methods for producing a signal representing current in an inductor, such as an inductor in an alternating current (AC)-to-direct current (DC) power converter including a boost topology. The principles of this description, however, are applicable to other types of power converters employing various topologies. For an example current-sensing arrangement for an inductor in a power converter, see U.S. patent application Ser. No. 17/490,104, entitled "Charge Mode Control for Power Factor Correction Circuit", filed Sep. 30, 2021, which is incorporated herein by reference.

Figure 1:
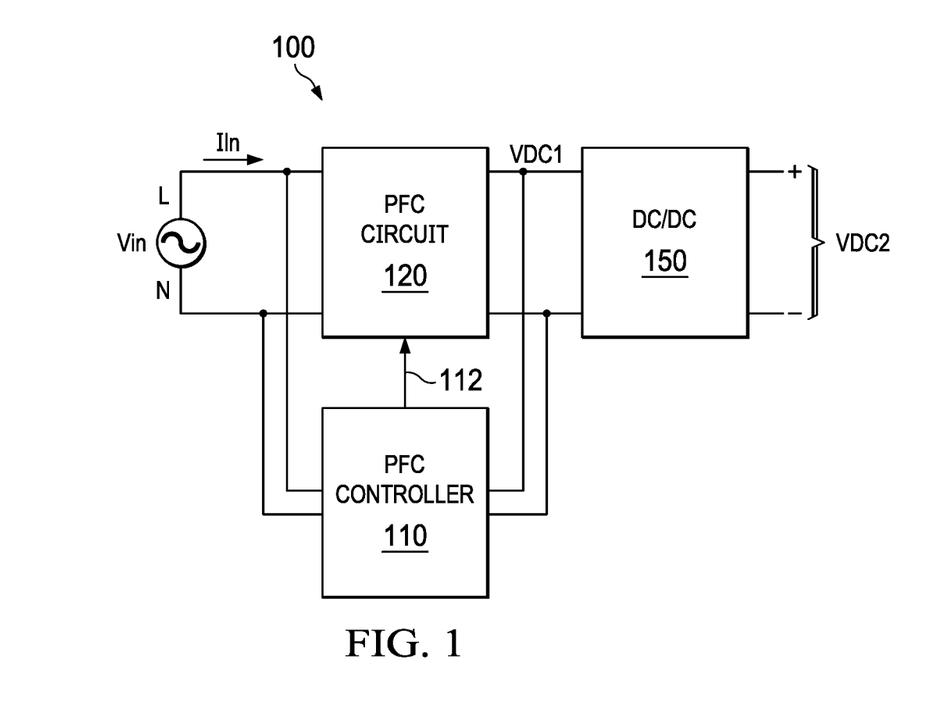
FIG. 1 is a block diagram of an example alternating current (AC)-to-direct current (DC) power converter.

FIG. 1 is a block diagram of an example alternating current (AC)-to-direct current (DC) power converter 100. The AC-to-DC power converter 100 includes a power factor correction (PFC) circuit 120, a DC-to-DC power converter 150, and a PFC controller 110. The input to the PFC circuit 120 is an AC input line voltage Vin, which may be provided, for example, by the AC mains (e.g., 115 VAC, 220 VAC, etc.). The PFC circuit 120 converts the AC input line voltage Vin from an AC voltage to a DC bus voltage VDC1. The magnitude of the DC bus voltage VDC1 is, for example, 400 VDC. The DC-to-DC power converter 150 converts the DC bus voltage VDC1 to a DC output voltage VDC2. The DC output voltage VDC2 may be, for example, 12 VDC, 48 VDC, etc. Generally, the magnitude of the DC output voltage VDC2 is often smaller than the magnitude of the DC bus voltage VDC1.

The AC-to-DC power converter 100 can be implemented in various ways. Each such implementation, however, includes at least one high-frequency power switch (e.g., a field-effect transistor (FET)) that is turned on and off in a regulated manner to cause the PFC circuit 120 to perform its specified function, which is to ensure that the input current Iin from the AC mains remains approximately sinusoidal and in-phase with respect to the sinusoidally varying AC input line voltage Vin. The PFC controller 110 generates one or more control signals, e.g., control signal 112, to control the on and off states of the power switch(es) within the AC-to-DC power converter 100 in response to one or more input signals such as the AC input line voltage Vin and the DC bus voltage VDC1 (the input and output voltages of the PFC circuit 120).

The difficulties of sensing the inductor current are overcome as described herein by synthesizing a current signal (a synthesized current signal) that can be related directly to the inductor current using a low power dissipation sense resistor referenced to local circuit ground. The synthesized current signal can also be used for cycle-by-cycle overload protection of the power switches of the power converter. It can be used to protect the system against a short-circuit failure in at least one of the power switches of the power converter. As a result, system cost and robustness are substantially improved by synthesizing the current signal. Synthesizing inductor current eliminates the need for DC current sensing with isolation.

Figure 2:
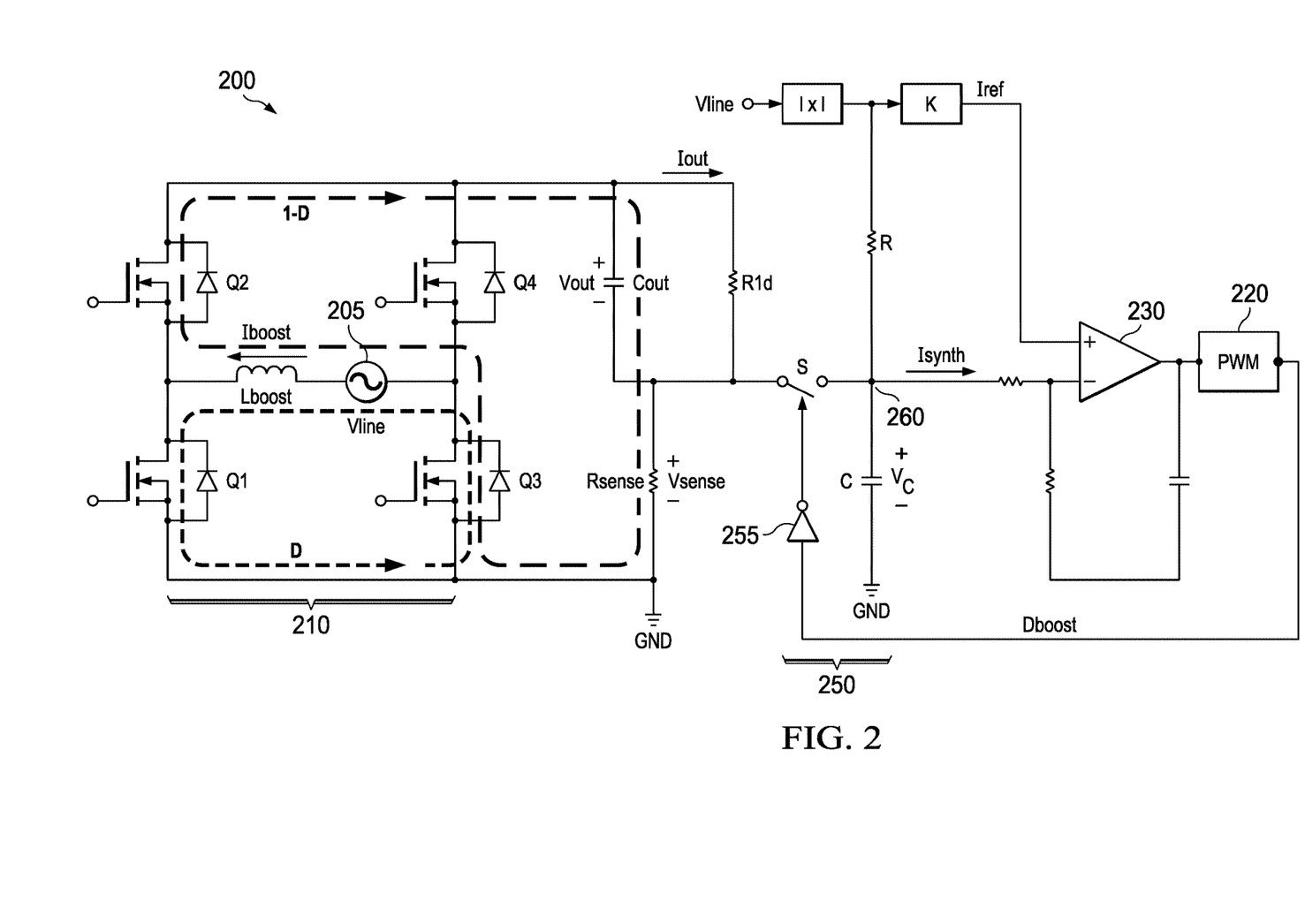
FIG. 2 is a schematic diagram of an example bridgeless AC-to-DC power converter.

FIG. 2 is a schematic diagram of an example bridgeless AC-to-DC power converter 200 that operates during a positive half cycle of an AC input line voltage Vline from a source of electrical power 205 (via a power terminal). The AC-to-DC power converter 200 includes a boost circuit 210 that provides a DC output voltage Vout (and an output current Iout) from the AC input line voltage Vline filtered by an output filter capacitor Cout to power a load, represented in FIG. 2 by a resistor Rld. The boost circuit 210 includes first, second, third and fourth power switches Q1, Q2, Q3, Q4 (e.g., FETs) controlled by a PWM controller 220 to operate during a first portion D (also commonly known as duty cycle D) and a second portion 1−D (also commonly known as the second portion 1−D) of a switching cycle of the AC-to-DC power converter 200. The AC-to-DC power converter 200 also includes a current estimating circuit 250 that provides an estimate of the boost inductor current Iboost that flows through the boost inductor Lboost of the AC-to-DC power converter 200.

During the first portion D of the switching cycle, a HIGH control signal Dboost produced by the PWM controller 220 in response to a signal produced by the error amplifier 230 is applied to the first power switch Q1 and the third power switch Q3 to enable conduction thereof. The error amplifier 230 receives a current (also referred to as a synthesized current Isynth) at the inverting input representing the boost inductor current Iboost that flows through the boost inductor Lboost from the current estimating circuit 250 and receives a reference signal Iref=K*|Vline| that varies in proportion to the magnitude of the AC input line voltage Vline at the non-inverting input. The constant K scales the AC input line voltage Vline to produce the reference signal Iref. The second power switch Q2 and the fourth power switch Q4 are turned off during the first portion D of the switching cycle, and each accordingly acts as an open circuit. The first power switch Q1 and the third power switch Q3 conduct and present a low-impedance connection between the AC input line voltage Vline and a local circuit ground GND (via a ground terminal). This applies the AC input line voltage Vline across the boost inductor Lboost, causing the boost inductor current Iboost in the boost inductor Lboost to increase at a rate proportional to the AC input line voltage Vline and inversely proportional to the inductance of the boost inductor Lboost.

Also during the first portion D of the switching cycle, a current estimating switch S is turned off via an inverter 255. A junction 260 between a current estimating resistor R and a current estimating capacitor C is not coupled to the output filter capacitor Cout, thereby allowing integration over time of the AC input line voltage Vline by the current estimating resistor R and the current estimating capacitor C. This integration produces the synthesized current Isynth ("synthesized estimate") of the boost inductor current Iboost that flows through the boost inductor Lboost during the first portion D of the switching cycle (e.g., replicating the boost inductor current Iboost through the boost inductor Lboost). A voltage Vc (also referred to as a "capacitor voltage") is provided across the current estimating capacitor C driven by a current through the current estimating resistor R provided by the AC input line voltage Vline applied thereto. As a result, the voltage Vc across the current estimating capacitor C represents a value of the boost inductor current Iboost that flows through the boost inductor Lboost. Accordingly, a value of the voltage Vc across the current estimating capacitor C is proportional to the value of the boost inductor current Iboost. In this manner, the synthesized current Isynth of the boost inductor current Iboost in the boost inductor Lboost is produced without a need to conduct current through a sense resistor Rsense during the first portion D of the switching cycle.

During the second portion 1−D of the switching cycle, a LOW control signal Dboost is produced by the PWM controller 230. The first power switch Q1 is turned off and the boost inductor current Iboost in the boost inductor Lboost is switched to the second power switch Q2. The voltage across the boost inductor Lboost is now equal to the instantaneous difference between the DC output voltage Vout and the AC input line voltage Vline. During this portion, the boost inductor current Iboost in the boost inductor Lboost is applied to the output through the second power switch Q2 and the third power switch Q3. While the description hereinabove applies to the positive half cycle of the AC input line voltage Vline, the operation of the first and second power switches Q1, Q2 and the third and fourth power switches Q3, Q4 is reversed during the negative half cycle of the AC input line voltage Vline.

Also during the second portion 1−D of the switching cycle, the current estimating switch S is turned on via the inverter 255. The boost inductor current Iboost in the boost inductor Lboost flows through a low-resistance sense resistor Rsense, which generates a sensed voltage Vsense across the sense resistor Rsense proportional to the boost inductor current Iboost in the boost inductor Lboost times the resistance of the sense resistor Rsense. Additionally, the sensed voltage Vsense across the sense resistor Rsense is applied to the current estimating capacitor C to provide the voltage Vc across the current estimating capacitor C. As a result, the voltage Vc across the capacitor C provides the estimate of the boost inductor current Iboost in the boost inductor Lboost. Accordingly, a value of the voltage Vc across the current estimating capacitor C is proportional to the value of the boost inductor current Iboost. The low resistance of the sense resistor Rsense (in comparison to the high resistance of the current estimating resistor R and the high impedance of the current estimating capacitor C) enables producing an estimate of the boost inductor current Iboost in the boost inductor Lboost during the second portion 1–D of the switching cycle when the current estimating switch S is turned on.

For example, the current estimating switch S is a FET that is selected to be sufficiently small to enable obtaining an acceptably low level of drain-to-source leakage current in an off state, i.e., so that it does not siphon away current that flows through the current estimating resistor R to the current estimating capacitor C. As described above, the sense resistor Rsense coupled to the current estimating switch S described herein carries the boost inductor current Iboost only during the second portion 1–D of the switching cycle. By using this circuit structure, power dissipation in the sense resistor Rsense can be substantially reduced, sometimes by as much as 77 percent depending on the duty cycle. This eliminates the need for continuously sensing current in the boost inductor Lboost, which avoids a cost and an efficiency-robbing circuit element in the AC-to-DC power converter 200.

Accordingly, a circuit and method are described herein to efficiently estimate a boost inductor current Iboost in a boost inductor Lboost with low cost. During the second portion 1–D of the switching cycle, the boost inductor current Iboost in the boost inductor Lboost is routed through the low-resistance sense resistor Rsense, and the resulting voltage is applied to the current estimating capacitor C by closing the current estimating switch S (effectively coupling the sense resistor Rsense to the current estimating capacitor C). The voltage Vc produced on the current estimating capacitor C is thus a direct estimate of the boost inductor current Iboost that flows in the boost inductor Lboost employing the low-resistance sense resistor Rsense coupled in series with the load Rld and the output filter capacitor Cout. The voltage Vc declines during this period as does the boost inductor current Iboost in the boost inductor Lboost.

During the first portion D of the switching cycle, the current estimating switch S is opened, which enables the current estimating resistor R (that has a high resistance relative to the resistance of the sense resistor Rsense) to be coupled to the AC input line voltage Vline to controllably deposit charge in the current estimating capacitor C. The positive-going change of the voltage Vc produced across the current estimating capacitor C by the current estimating resistor R is selected to be equal to the positive-going change of the sensed voltage Vsense produced across the sense resistor Rsense during the second portion 1–D of the switching cycle, which is driven by the AC input line voltage Vline minus the DC output voltage Vout. This ignores a small voltage Vsense drop in the sense resistor Rsense. In this way, an indirect measurement of the boost inductor current Iboost that flows in the boost inductor Lboost is obtained during the first portion D of the switching cycle by matching the positive-going change of the sensed voltage Vsense across the sense resistor Rsense to be equal to the positive-going change of the voltage Vc across the current estimating capacitor C.

The sensed voltage Vsense across the sense resistor Rsense is applied to the current estimating capacitor C during the second portion 1–D of the switching cycle and provides a continuing correction for error for the RC circuit including the current estimating resistor R and the current estimating capacitor C, as well as error in the RC time constant itself. Accordingly, the voltage Vc across the current estimating capacitor C during the second portion 1–D of the switching cycle is the same as the sensed voltage Vsense across the sense resistor Rsense.

The change of sensed voltage Vsense produced across the sense resistor Rsense during the second portion 1–D of the switching cycle is computed as follows. For the boost circuit topology, the first portion D is given by D=1−(Vline/Vout) or, equivalently, Vline=Vout*(1−D). The voltage difference Vout−Vline for the boost circuit 210 can be expressed in terms of the DC output voltage as Vout−Vline=Vout*D, which leads to an equation for the change in sensed voltage Vsense produced across the sense resistor Rsense:

$$Vsense=(Vout-Vline)*(1-D)*Rsense/(L*fs),$$

where fs is the switching frequency of the AC-to-DC power converter 200 and L is the inductance of the boost inductor Lboost, and $$Vsense=Vline*D*Rsense/(L*fs).$$

The voltage Vc produced across the current estimating capacitor C during the first portion D of the switching cycle is given by:

$$Vc=Vline*D/(R*C*fs).$$

Recognizing that the downward change in the sensed voltage Vsense produced across the sense resistor Rsense during the second portion 1–D of the switching cycle must equal the upward change in the voltage Vc produced across the current estimating capacitor C during the first portion D of the switching cycle (that represents the synthesized current Isynth for the boost inductor current Iboost in the boost inductor Lboost during the entire switching cycle). The equality of these two voltages provides the equation:

$$Vline*D*Rsense/(Lboost*fs)=Vline*D/(R*C*fs),$$

which simplifies to:

$$Lboost/Rsense=R*C.$$

Advantageously, the equation above is not duty-cycle dependent and is not dependent on the AC input line voltage Vline or the DC output voltage Vout.

For example, if the inductance of the boost inductor Lboost is 100 microhenries and the resistance of the sense resistor Rsense is 100 microohms, then the R*C product that represents the series combination of the current estimating resistor R and the current estimating capacitor C must be one second, which is the 100 microhenries divided by the 100 microohms. If the resistance of the current estimating resistor R is chosen to be 10 megohms to produce a low power level in the current estimating resistor R, then the capacitance of the current estimating capacitor C would be 0.1 microfarad.

From another perspective, during the first portion D of the switching cycle illustrated in FIG. 2, the boost inductor current Iboost in the boost inductor Lboost is given by the equation:

$$I_L(t) = \int_{Ia}^{t} \frac{Vline}{Lboost} dt$$

where Ia represents the beginning of the integration at the start of the first portion D of the switching cycle such as for average current mode control, and $I_L(t)$ represents the time-varying current in the boost inductor Lboost (note that Iboost and $I_L$ both refer to the current through the boost inductor Lboost).

The voltage Vc across the current estimating capacitor C is proportional to the current flowing in the current estimating resistor R. If the AC input line voltage Vline is much greater than the capacitor voltage Vc, the time-varying voltage $V_c(t)$ on the current estimating capacitor C will also be proportional to the AC input line voltage Vline:

$$V_C(t) = \int_{Va}^{t} \frac{Vline}{RC} dt$$

During the second portion 1−D of the switching cycle, the voltage Vc on the current estimating capacitor C tracks the boost inductor current Iboost in the boost inductor Lboost and therefore represents the synthesized estimate Isynth for the boost inductor current Iboost in the boost inductor Lboost. A units change in the equations above to convert units of time represented by an RC product to units of inductance represented by the inductance of the boost inductor Lboost is recognized. The product RC is recognized to have units of time, and the ratio L/R is also recognized to have units of time. Accordingly, the assumption of the one-ohm resistor is made, without limitation, for descriptive simplicity. The voltage Va is conceptually the same functionality as Ia, where both parameters represent respective start times for the integration at beginnings of respective portions of the duty cycle:

Ia=Va.

The product of the resistance of the current estimating resistor R and the capacitance of the current estimating capacitor C, can be selected to be equal to Lboost/Rsense (recognizing again the difference in units). It is assumed for the sake of clarity and simplicity, a one-ohm resistor for the current-sense resistor Rsense. The voltage $V_C(t)$ at the junction of current estimating resistor R and current estimating capacitor C becomes a good replica with scaling for the boost inductor current $I_L(t)$:

$$V_C(t) = \int_{Va}^{t} \frac{Vin}{RC} dt = \int_{Ia}^{t} \frac{Vin}{L} dt = I_L(t)$$

$$V_C(t) = I_L(t)$$

The voltage Vc on the current estimating capacitor C accordingly can be used to synthesize an inductor current estimate over an entire switching cycle, for use, for example, in an average current mode PFC control process, or to manage a peak current in the boost inductor Lboost. Because the voltage Vc of the current estimating capacitor C is an analog of the instantaneous boost inductor current over an entire duty cycle, it can also be used for cycle-by-cycle current limit protection of the boost power switch. Under normal boost operation and certain circumstances, the current in a current sensing component should not be negative. If one of the power switches Q1, Q2, Q3, Q4 fails short, the output capacitor Cout will discharge through the power switch above it or the power switch below it, the fault current appearing as a large negative signal across the synthesized current sensing device. This synthesized current sensing signal can be used to quickly turn off the power switches Q1, Q2, Q3, Q4, and to limit the fault current to an acceptable/safe value.

Due to ordinary component variations, the voltage drop presented by a forward conducting diode and the value of the boost inductor Lboost itself cannot be exactly equal to the value of the RC product. The mismatch in values will result in an error of the current slope during the on-time of the boost power switch. Mismatches generated by normal component and manufacturing variances will have only a modest impact on power factor and on harmonic content of the AC input line current Vline. This impact is acceptable in the vast majority of applications.

Figure 3:
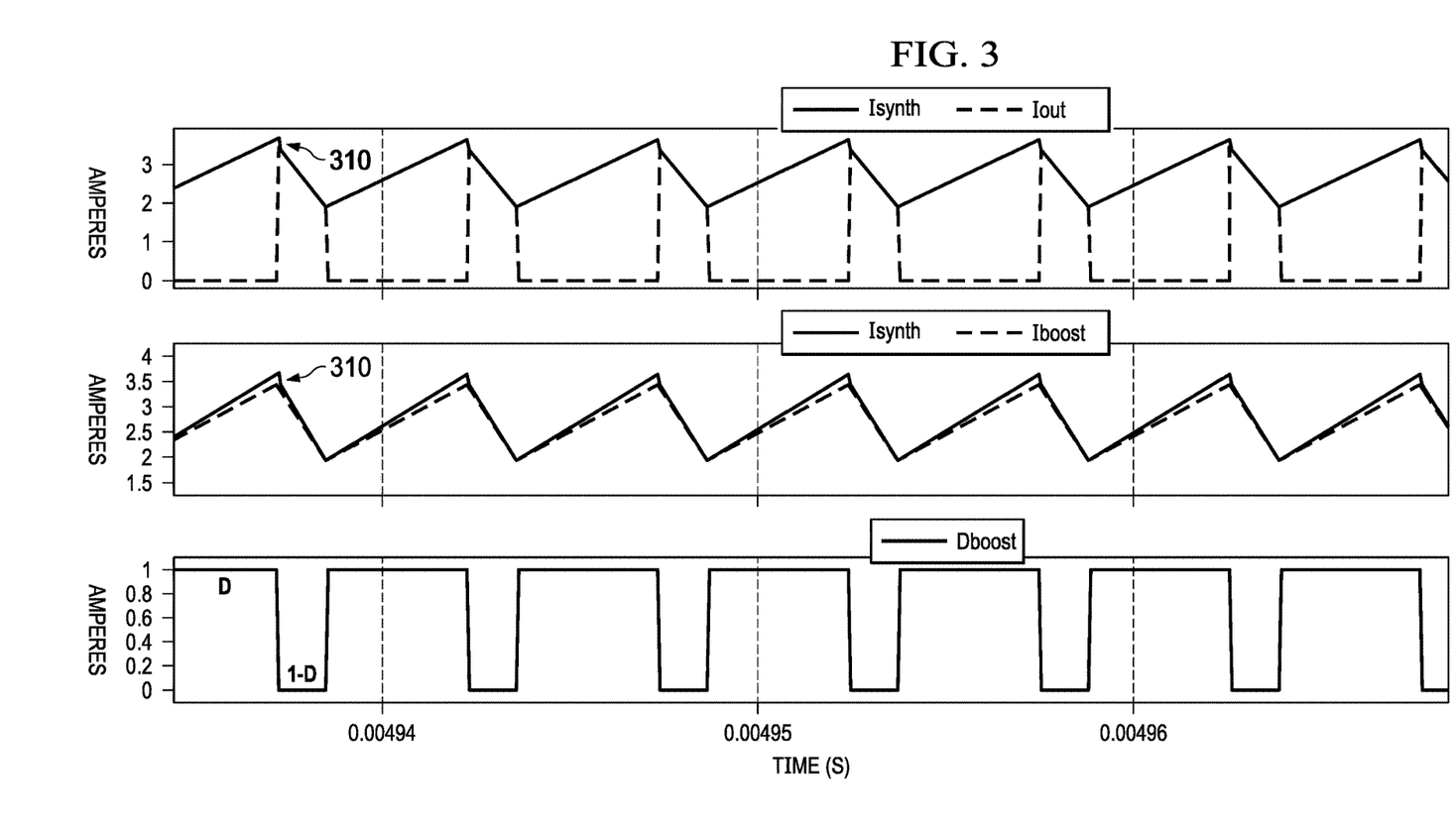
FIG. 3 illustrates example waveforms associated with sensing boost inductor current in the boost inductor of the AC-to-DC power converter of FIG. 2.

FIG. 3 are example waveforms associated with sensing boost inductor current Iboost in the boost inductor Lboost of the AC-to-DC power converter 200 of FIG. 2. The effect of a ten percent mismatch is illustrated in the waveforms of FIG. 3. The bottom waveform illustrates control signals from the PWM controller 220 representing the first portion D and the second portion 1−D of the switching cycle of the AC-to-DC power converter 200. The middle waveform represents the synthesized current Isynth and the boost inductor current Iboost in the boost inductor Lboost. A small discontinuity 310 (i.e., an error) in the synthesized current Isynth is corrected at the transition from the first portion D to the second portion 1−D of the switching cycle. The upper waveform represents the synthesized current Isynth and the output current Iout of the AC-to-DC power converter 200. Again, the small discontinuity 310 (i.e., the error) in the synthesized current Isynth is corrected at the transition from the first portion D to the second portion 1−D of the switching cycle.

Figure 4:
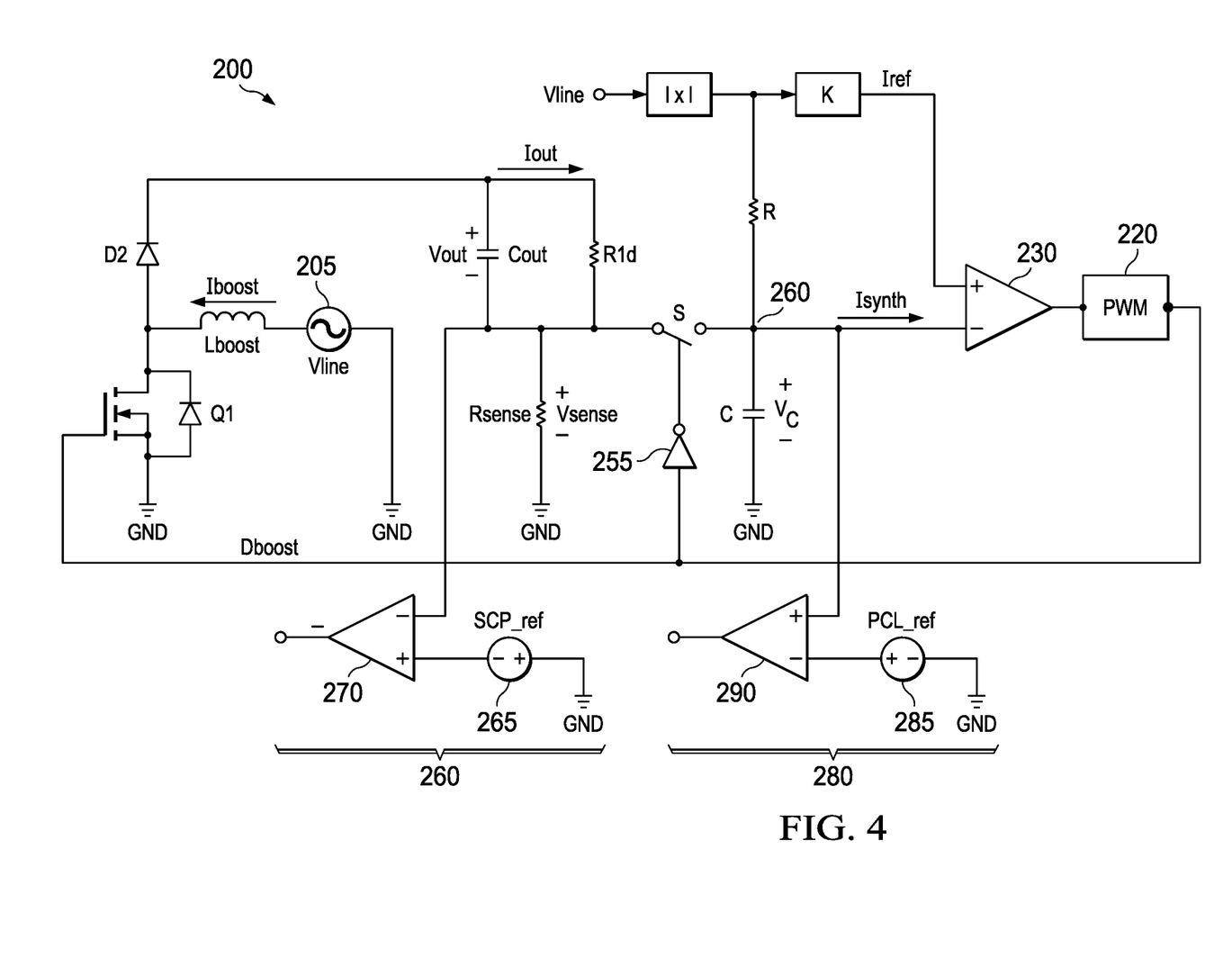
FIG. 4 is a schematic diagram of a portion of the AC-to-DC power converter of FIG. 2 including protection circuits.

FIG. 4 is a schematic diagram of a portion of the AC-to-DC power converter 200 of FIG. 2 including protection circuits. For purposes of explanation, the schematic diagram of the portion of the AC-to-DC power converter 200 of FIG. 4 omits the third and fourth power switches Q3, Q4, and the second power switch Q2 is represented by a diode D2. The protection circuits are operable during the first portion D of the switching cycle of the AC-to-DC power converter 200, and include a short circuit protection (SCP) circuit 260 and a peak current limit (PCL) circuit 280.

The short circuit protection circuit 260 includes a SCP reference signal generator 265 that provides a SCP reference signal SCP_ref to a non-inverting input of a SCP comparator 270. The SCP comparator 270 also receives a signal representing the sensed voltage Vsense of the sense resistor Rsense at an inverting input thereof. An output signal produced by the SCP comparator 270 is employed to turn off (disable) the power switches Q1, Q2, Q3, Q4. If any of the power switches Q1, Q2, Q3 and Q4 fails short, the output capacitor Cout will discharge through the complementary power switch associated with the shorted power switch, resulting in extremely high fault current. To mitigate the risk of damage, the SCP comparator 270 generates the output signal that permanently turns off all power switches Q1, Q2, Q3, Q4 if significant negative current is detected on the sense resistor Rsense. This eliminates the need for current sensing and protection of the individual power switches.

The peak current limit circuit 280 includes a PCL reference signal generator 285 that provides a PCL reference signal PCL_ref to an inverting input of a PCL comparator

290. The PCL comparator 290 also receives a signal representing the voltage Vc across the current estimating capacitor C at a non-inverting input thereof. The peak current limit circuit 280 provides a process for disabling the power switches Q1, Q2, Q3, Q4 in response to detecting a high level of current by the PCL comparator 290. The PCL comparator 290 terminates conduction (disable) of the power switches Q1, Q2, Q3, Q4 when the voltage Vc on the current estimating capacitor C exceeds the PCL reference signal PCL_ref. The voltage Vc on the current estimating capacitor C is the analog of the boost power switch/inductor current. This operation will result in cycle-by-cycle current limit protection of the power switches Q1, Q2, Q3, Q4.

As the circuit arrangement generates a signal that is an accurate analog of the boost inductor current Iboost, it can be used to provide inductor current information to any controller that would benefit from this information. This is particularly relevant to other PFC control algorithms, for example one known in the art as "Single Cycle Control." Even in baseline boost PFC controlled power converters, where the boost inductor current Iboost can be readily sensed on a sense resistor Rsense, the process described herein offers the advantage of reduced power dissipation on the sense resistor Rsense. The process can be used to synthesize the value of the instantaneous boost inductor current Iboost instead of a per-cycle average of the output current Iout. This enables development of a low cost, analog controller for the AC-to-DC power converter 200. The techniques described hereinabove can also be applied, without limitation, to other power converter topologies including a buck topology.

Accordingly, a system and method to estimate a current in an inductor of a power converter is described herein. With continuing reference to the above-described drawings and features with reference numbers, an example power converter (200) (e.g., employing a boost topology) including a current estimating circuit (250) is hereinafter summarized. The power converter (200) (205) includes a first power switch (Q1) and a second power switch (Q2) coupled to a power terminal (couplable to the source of electrical power (205)). The first power switch is configured to conduct during a first portion (D) of a switching cycle of the power converter (200), and the second power switch is configured to conduct during a second portion of the switching cycle of the power converter. The power converter (200) also includes an inductor (Lboost) coupled to the first power switch (Q1) and the second power switch (Q2).

A current estimating circuit (250) of the power converter (200) includes a current estimating resistor (R), a current estimating capacitor (C), a sense resistor (Rsense), and a switch (S). The current estimating resistor (R) is coupled in series with the current estimating capacitor (C) and coupled to the power terminal. The current estimating resistor (R) and the current estimating capacitor (C) are coupled between the power terminal and a ground terminal (couplable to a local circuit ground (GND)). The current estimating resistor (R) and the current estimating capacitor (C) are configured to provide a voltage (Vc) across the current estimating capacitor (C) during the first portion (D) of the switching cycle, in which the voltage (Vc) across the current estimating capacitor (C) is proportional to an inductor current (Iboost) that flows through the inductor (Lboost). During the first portion (D) of the switching cycle, the switch (S) is configured to be open. The current estimating resistor (R) and the current estimating capacitor (C) are configured to provide a synthesized estimate (Isynth) of the inductor current (Iboost) that flows through the inductor (Lboost) during the first portion (D) of the switching cycle.

The sense resistor (Rsense), coupled in parallel to the current estimating capacitor (C), is configured to provide a sensed voltage (Vsense) across the sense resistor (Rsense) during the second portion (1−D) of the switching cycle. The power converter (200) also includes an output filter capacitor (Cout). The sense resistor (Rsense) is coupled between the output filter capacitor (Cout) and the ground terminal.

The switch (S) is configured to couple the sense resistor (Rsense) to the current estimating capacitor (C) to apply the sensed voltage (Vsense) across the sense resistor (Rsense) to the current estimating capacitor (C) to provide the voltage (Vc) across the current estimating capacitor (C) during the second portion (1−D) of the switching cycle. The sensed voltage (Vsense) across the sense resistor (Rsense) applied across to the current estimating capacitor (C) to provide the voltage (Vc) across the current estimating capacitor (C) during the second portion (1−D) of the switching cycle is configured to provide a correction for error for an RC circuit including the current estimating resistor (R) and the current estimating capacitor (C).

A discontinuity between the synthesized estimate (Isynth) and the inductor current (Iboost) is configured to be corrected at a transition from the first portion (D) to the second portion (1−D) of the switching cycle.

In this description, the term "couple" may cover connections, communications, or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

In this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

In this description, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end user and/or a third party.

While the use of particular transistors is described herein, other transistors (or equivalent devices) may be used instead. For example, a p-channel field effect transistor ("PFET") may be used in place of an n-channel field effect transistor ("NFET") with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are components of an integrated circuit and other elements are external to the integrated circuit, in other example embodiments, additional or fewer features may be incorporated into the integrated circuit. Also, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (a) incorporated in/over a semiconductor substrate; (b) incorporated in a single semiconductor package; (c) incorporated into the same module; and/or (d) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Some or all of the circuit elements described herein may be discrete electronic components constructed and separately mounted onto a suitable physical substrate. Some or all of the circuit elements described herein may be constructed on a same monolithic transistor semiconductor substrate.

Modifications are possible in the described embodiments, and other embodiments are possible, within the scope of the claims.

What is claimed is:

1. A power converter, comprising:
 a first power switch and a second power switch coupled to a power terminal, the first power switch configured to conduct during a first portion of a switching cycle, and the second power switch configured to conduct during a second portion of the switching cycle;
 an inductor coupled to the first power switch and the second power switch; and
 a current estimating circuit, including:
  a current estimating resistor coupled in series with a current estimating capacitor and coupled to the power terminal, the current estimating resistor and the current estimating capacitor being configured to provide a voltage across the current estimating capacitor during the first portion of the switching cycle, in which the voltage across the current estimating capacitor is proportional to an inductor current that flows through the inductor;
  a sense resistor, coupled in parallel to the current estimating capacitor, configured to provide a sensed voltage across the sense resistor during the second portion of the switching cycle; and
  a switch configured to apply the sensed voltage to the current estimating capacitor to provide the voltage across the current estimating capacitor during the second portion of the switching cycle;
  wherein the switch is configured to be open during the first portion of the switching cycle.

2. The power converter of claim 1, wherein the current estimating resistor and the current estimating capacitor are coupled between the power terminal and a ground terminal.

3. The power converter of claim 1, further comprising an output filter capacitor, in which the sense resistor is coupled between the output filter capacitor and a ground terminal.

4. The power converter of claim 1, further comprising a short circuit protection circuit configured to disable the first power switch and the second power switch when a signal representing the sensed voltage exceeds a reference signal.

5. The power converter of claim 1, further comprising a peak current limit circuit configured to disable the first power switch and the second power switch when the voltage across the current estimating capacitor exceeds a reference signal.

6. The power converter of claim 1, wherein the current estimating resistor and the current estimating capacitor are configured to provide a synthesized estimate of the inductor current that flows through the inductor during the first portion of the switching cycle.

7. The power converter of claim 6, wherein the current estimating resistor and the current estimating capacitor are configured to correct a discontinuity between the synthesized estimate and the inductor current at a transition from the first portion to the second portion of the switching cycle.

8. The power converter of claim 1, wherein the current estimating resistor and the current estimating capacitor are part of an RC circuit, and the current estimating resistor and the current estimating capacitor are configured to correct an error in the RC circuit by providing the voltage across the current estimating capacitor during the second portion.

9. The power converter of claim 1, wherein the power converter has a boost topology.

10. A method of estimating an inductor current in a power converter that includes a set of power switches coupled to a power terminal and an inductor, the method comprising:
 producing a voltage across a current estimating capacitor coupled in series with a current estimating resistor coupled to the power terminal during a first portion of a switching cycle of the power converter, in which the voltage across the current estimating capacitor is proportional to the inductor current that flows through the inductor;
 producing a sensed voltage across a sense resistor, coupled in parallel to the current estimating capacitor, during a second portion of the switching cycle;
 applying the sensed voltage to the current estimating capacitor to provide the voltage across the current estimating capacitor during the second portion of the switching cycle via a switch that couples the sense resistor to the current estimating capacitor; and opening the switch during the first portion of the switching cycle.

11. The method of claim 10, wherein the current estimating resistor and the current estimating capacitor are coupled between the power terminal and a ground terminal.

12. The method of claim 10, wherein the sense resistor is coupled between an output filter capacitor and a ground terminal.

13. The method of claim 10, wherein the set of power switches includes a first power switch and a second power switch; and further comprising disabling the first power switch and the second power switch when a signal representing the sensed voltage exceeds a reference signal.

14. The method of claim 10, wherein the set of power switches includes a first power switch and a second power switch; and further comprising disabling the first power switch and the second power switch when the voltage across the current estimating capacitor exceeds a reference signal.

15. The method of claim 10, further comprising producing a synthesized estimate of the inductor current that flows through the inductor during the first portion of the switching cycle of the power converter with the current estimating resistor and the current estimating capacitor.

16. The method of claim 15, further comprising correcting a discontinuity between the synthesized estimate and the inductor current at a transition from the first portion to the second portion of the switching cycle.

17. The method of claim 10, wherein applying the sensed voltage corrects an error in an RC circuit that includes the current estimating resistor and the current estimating capacitor.

18. The method of claim 10, wherein the power converter has a boost topology.

* * * * *